United States Patent [19]

Cadée

[11] Patent Number: 4,735,597
[45] Date of Patent: Apr. 5, 1988

[54] INFINITELY VARIABLE TRANSMISSION SYSTEM WITH A HYDRAULICALLY OPERATED DAMPING MEMBER

[75] Inventor: Theodorus P. M. Cadée, Goirle, Netherlands

[73] Assignee: Van Doorne's Transmissie B.V., Tilburg, Netherlands

[21] Appl. No.: 796,432

[22] Filed: Nov. 8, 1985

[30] Foreign Application Priority Data

Nov. 13, 1984 [NL] Netherlands .................. 8403461

[51] Int. Cl.⁴ .................................... F16H 11/04
[52] U.S. Cl. ...................................... 474/28; 474/18; 74/861; 180/293; 180/312
[58] Field of Search .............. 474/18, 28; 74/867, 74/868, 869; 180/293, 312

[56] References Cited

U.S. PATENT DOCUMENTS

| | | | |
|---|---|---|---|
| 2,161,670 | 6/1939 | Freeman et al. | 180/293 |
| 3,395,586 | 8/1968 | Kirchner | 474/28 X |
| 4,094,203 | 6/1978 | van Deursen et al. | 474/28 |
| 4,152,947 | 6/1979 | van Deursen et al. | 474/28 |
| 4,274,520 | 6/1981 | Van der Hardt Aberson | 474/28 |
| 4,308,940 | 1/1982 | Cadee | 192/103 FA |
| 4,369,675 | 1/1983 | van Deursen | 474/28 |
| 4,400,164 | 8/1983 | Cadee | 474/12 |
| 4,467,674 | 8/1984 | van Deursen et al. | 74/867 |
| 4,500,301 | 2/1985 | Cadee | 474/28 |
| 4,510,822 | 4/1985 | Yamamuro et al. | 474/28 X |
| 4,531,927 | 7/1985 | Cadee | 474/72 |
| 4,572,321 | 2/1986 | Morita | 180/312 X |

FOREIGN PATENT DOCUMENTS

027672A1 4/1981 European Pat. Off. .
2518496 5/1976 Fed. Rep. of Germany .
2138895A 10/1984 United Kingdom .

Primary Examiner—James A. Leppink
Assistant Examiner—Matthew Smith
Attorney, Agent, or Firm—Cushman, Darby & Cushman

[57] ABSTRACT

Infinitely variable transmission for a device with an internal combustion engine (67) is provided with an endless transmission member (14) which has been looped over two pulleys, each having a running groove situated between conical pulley halves (2,3 and 8,9 resp.), at least one conical half of each pulley being axially movable through an associated hydraulic cylinder (4,12), also provided with a first control valve (40) for regulation of the fluid pressure in the cylinder (12) of the driven pulley and in the supply line to a second control valve (20), which second valve is intended for the adjustment of the transmission ratio by regulation of the amount of fluid supplied to and discharged from the cylinder (4) of the driving pulley. Devices have been provided for the operation of the first control valve (40) which bring about an increase or a decrease of the fluid pressure in the cylinder (12) of the driven pulley, depending on the movements of the engine block.

2 Claims, 2 Drawing Sheets

INFINITELY VARIABLE TRANSMISSION SYSTEM WITH A HYDRAULICALLY OPERATED DAMPING MEMBER

BACKGROUND OF THE INVENTION

1. Field of the Invention

The invention relates to an infinitely variable transmission for a device, for instance a vehicle, with a combustion engine, provided with an endless transmission member which has been looped over two pulleys, each having a running groove situated between conical pulley halves, while at least one conical half of each pulley is axially movable through an associated hydraulic cylinder, also provided with a first control valve for regulating the fluid pressure in the cylinder of the driven pulley and in the supply line to a second control valve which is intended for adjustment of the transmission ratio by regulation of the amount of fluid supplied to and discharged from the cylinder of the driving pulley.

2. Description of the Related Art

In such a device, which has earlier been proposed and described in the Netherlands patent application 7414914, the tension in the endless transmission member (drive belt) is controlled irrespective of the setting of the transmission ratio by means of the first control valve. To do so, the first control valve reduces the fluid pressure built up by a pump, and this reduced fluid pressure exists in one of the operating cylinders, for the purpose of setting the tension of the drive belt. The other operating cylinder is supplied with fluid by a second control valve which transmits the reduced fluid pressure to or from that operating cylinder in order that, depending on a control signal, the transmission ratio may be set through a specific position of that operating cylinder.

The tension in the endless transmission member must be sufficient under all conditions to transmit the engine torque without any slip. As this tension is, in the equilibrium situation, determined in the driven pulley, it is essential that the fluid pressure which governs the pinching force between the pulley halves has at all times a high enough value under divergent conditions of load, contributing factors being the set transmission ratio and the speed of the driving pulley, among other things. Accordingly, the control system provides a certain fluid pressure by means of the valves. However, for slipfree operation upon extreme changes in load, for instance upon fierce acceleration when the device is used for the propulsion of a vehicle, this fluid pressure must be higher than under the normal, more or less constant load conditions. To ensure that no slip occurs upon extreme changes, it has till now been common practice to set the fluid pressure and hence the pinching force in the driven pulley to a higher value than is required with the normal, more or less constant load. In consequence, the tension in the transmission member (drive belt) is also greater, which may have an adverse effect on, for instance, the efficiency and the useful life.

SUMMARY OF THE INVENTION

It is an object of the present invention to lessen this drawback. A device according to the invention comprises a combustion engine and an infinitely variable transmission, provided with an endless transmission member which has been looped over two pulleys, each having a groove situated between conical pulley halves, whilst at least one conical half of each pulley is axially movable through the action of an associated hydraulic cylinder, also provided with a first control valve for regulation of the fluid pressure in the cylinder of the driven pulley and in the supply line to a second control valve which is intended for adjustment of the transmission ratio by regulation of the amount of fluid supplied to and discharged from the cylinder of the driving pulley, and is characterized in that means are present for the operation of the first control valve which bring about an increase or a decrease of the fluid pressure in the cylinder of the driven pulley, depending on the movements of the engine block.

As is commonly known, the engine block is virtually never rigidly connected to a structure, for instance the chassis of a vehicle, but almost invariably supported through damping members, for instance rubber blocks which reduce the transfer of vibrations from the engine block to the structure. The vibrations of the engine block consist of a combination of a combination of so-called high-frequency oscillations (frequency exceeding approximately 90 Hz) and low-frequency oscillations. The high-frequency oscillations are perceived as a hum, the low-frequency ones manifest themselves by tilting movements of the engine block, especially upon changes in engine speed. The transfer of the high-frequency oscillations is reduced more according as the damping members, say the rubber blocks, are designed softer. However, soft damping members inevitably give rise to more pronounced, especially tilting, movements of the engine block upon changes in speed and load of the engine and, if the engine is mounted in a vehicle, during driving over a poor road surface. Perforce, it has invariably been necessary to strike a compromise in which a certain amount of tilting of the engine block was accepted.

According to the invention, tilting of the engine block is utilized to achieve a better infinitely variable transmission. For, inasmuch as means are present which increase or decrease the fluid pressure in the cylinder of the driven pulley upon movement of the engine block due to changes in load, the pinching force need not be set to a higher value than is required with the normal, more or less constant load.

In most applications of drive with a combustion engine, a coupling device is interposed between the engine and the driven mechanism, for instance the aforementioned infinitely variable transmission, in particular for a vehicle. If, as is true for this very application, such a coupling device is operated by the fluid pressure originating from the same source, the aforesaid means may be caused also to control the fluid pressure in the coupling device, whereby a smooth engagement and disengagement of the driven mechanism depending on the load can be achieved. Such smooth engagement/disengagement of the coupling is known to be of particular importance for vehicles. The invention can therefore also be applied advantageously to systems employing not an infinitely variable transmission, but rather a more or less conventional transmission, for instance one making use of a manually operable gearbox. In all cases the coupling will have to be adjusted so that the vehicle does not start "creeping" when the said means come into play.

The variations in fluid pressure effected by the aforesaid means can also be used for damping of the movements, more specifically the tilting, of the engine block. This is especially important for vehicles with a transversely mounted engine block. If desired, two or more of the aforementioned possible applications of the variations in pressure effected by the means may be combined.

The conversion of the movement of the engine block, more particularly its tilting, into a variation of the fluid pressure throughout the entire control system can be accomplished in more than one way. Preferably, however, one or more additional control valves are used which incorporate a sleeve that reacts to the movement of the engine block, which sleeve closes and opens ports in the fluid circuit supplying the pressure needed for the operation of the first valve, and/or the coupling and/or the damping members of the engine block. The additional control valve is preferably linked directly to the engine block by mechanical means; alternatively, however, an electromechanical coupling may be used, for instance by employing a strain gauge, i.e. an element whose electrical resistance depends on the mechanical stress present therein.

BRIEF DESCRIPTION OF THE DRAWINGS

The invention will now be elucidated with reference to drawings of an embodiment with additional control valves.

DETAILED DESCRIPTION OF THE PREFERRED EMBODIMENTS

Figure 1:
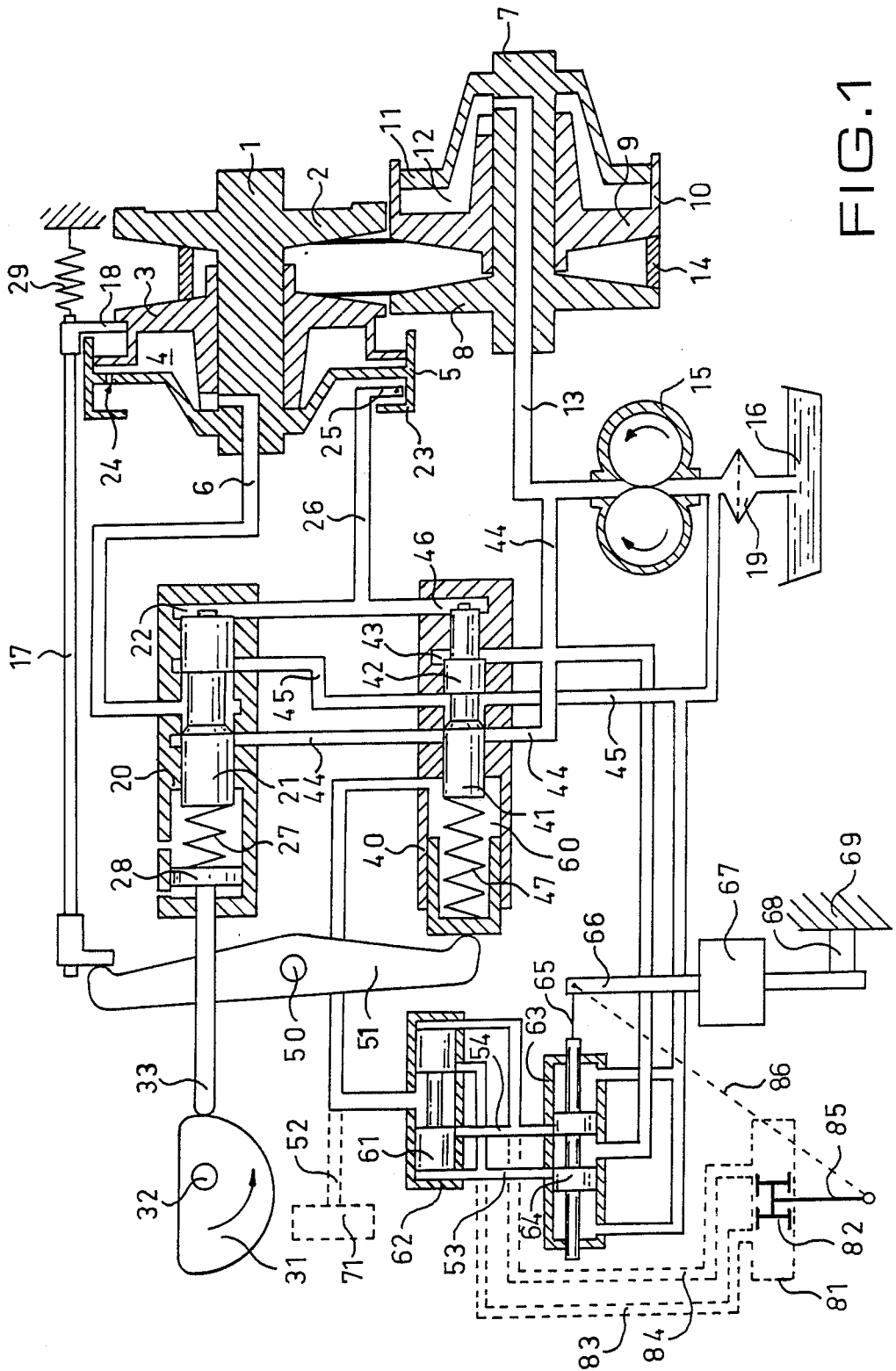
FIG. 1 shows a schematic illustration of the present invention.

The embodiment schematically represented in FIG. 1 comprises a primary or input shaft 1, provided with a fixed and an axially movable conical sheave (2 and 3, respectively), which together form the primary pulley. The sheave 3 forms the piston of the cylinder 5 encompassing the cylinder space 4 and can be axially displaced by the supply and discharge of fluid through a line 6. Also, a secondary or output shaft 7 is present, likewise provided with a fixed and an axially movable conical sheave (8 and 9, respectively), which together constitute the secondary pulley. Sheave 9 is integrally connected to a cylinder 10 which accommodates a piston 11 fixedly connected to the secondary shaft 7 so as to encompass a cylinder space 12. Fluid can be supplied to and discharged from the cylinder space 12 through a line 13.

A V-shaped drive belt 14 is looped over the primary and the secondary pulley. This may be, for instance, a reinforced or non-reinforced synthetic drive belt or a metal belt. By the axial displacement of the conical sheaves 3 and 9 the running diameters of the drive belt about the two pulleys can be changed such that the difference in rotation speed of shafts 1 and 7 can be varied infinitely. The fluid pressure in cylinder space 12 also results in the requisite tensile force being present in the drive belt 14.

Furthermore the embodiment comprises a fluid pump 15 for drawing in and pressurizing fluid from a reservoir 16 through a filter 19.

For sensing the actual transmission ratio, a rod 17 is provided which rests against the axially movable sheave 3 by means of a sensing shoe 18 under the action of a tension spring 29. Depending on the transmission ratio, the rod 17 shifts in an axial direction.

Also, a first valve 40 is present which acts as overflow valve for controlling the fluid pressure built up by pump 15, which fluid pressure also prevails in the cylindrical space 12. The valve 40 is fitted with an axially movable sleeve 41. As the sleeve 41 is provided with a widened part 42 which is in contact with the fluid in space 43 supplied by pump 15, a pressure build-up will cause the sleeve 41 to move to the left (in the drawing).

The pressure in the space 60 which co-determines the position of sleeve 41 is controlled by the position of a slide 61 in the first additional valve 62. This valve 62 is hydraulically connected by the lines 53 and 54, through the second additional valve 63 with the slide 64 present therein, to lines 44 and 45 of the pumping system. The slide 64 is linked mechanically through the rod 65 to the element 66 which is firmly attached to the engine block 67 or is integral with it. In addition the engine 67 is attached through a damping member, for instance a rubber block, to a structure 69, for instance the chassis of a vehicle.

The operation of the embodiment represented can be summarized as follows.

Movement of the engine block 67 and the elements 66 and 65 will cause the slide 64 to shift. Depending on this shift, the pressure exerted by pump 15 will displace the slide 61 to the right or to the left. In consequence, the pressure in space 60 does not depend on the direction in which the slide 64 shifts, that is to say, on the direction of motion of the engine block 67, but it does depend on the extent of the displacement of the engine block 67. The change in pressure in space 60 affects the movement of sleeve 41 in such a fashion that greater displacements of the engine block 67 cause the pinching force between the pulley halves 8 and 9 to increase. In point of fact a greater pinching force is temporarily desired when a sudden increase of the torque delivered by the engine occurs, for instance upon fierce acceleration of a vehicle. As is known, this is attended with a pronounced movement, especially tilting, of the engine block.

Sleeve 41 which controls the pressure of the fluid delivered by pump 15 is also influenced by the input speed of shaft 1. For the sensing of this speed, cylinder 5 is fitted with an annular channel 23 which is radially closed from the outside and which is filled with fluid from cylindrical space 4 via a passage 24. Obviously, filling may also be done from the outside via a separate fluid supply line. By means of a pitot tube 25, the fluid in channel 23 rotating with the primary shaft 1 is converted into a fluid pressure, which is passed on through line 26 to space 46 in which the fluid pressure therefore depends on the speed of the primary shaft 1.

Figure 2:
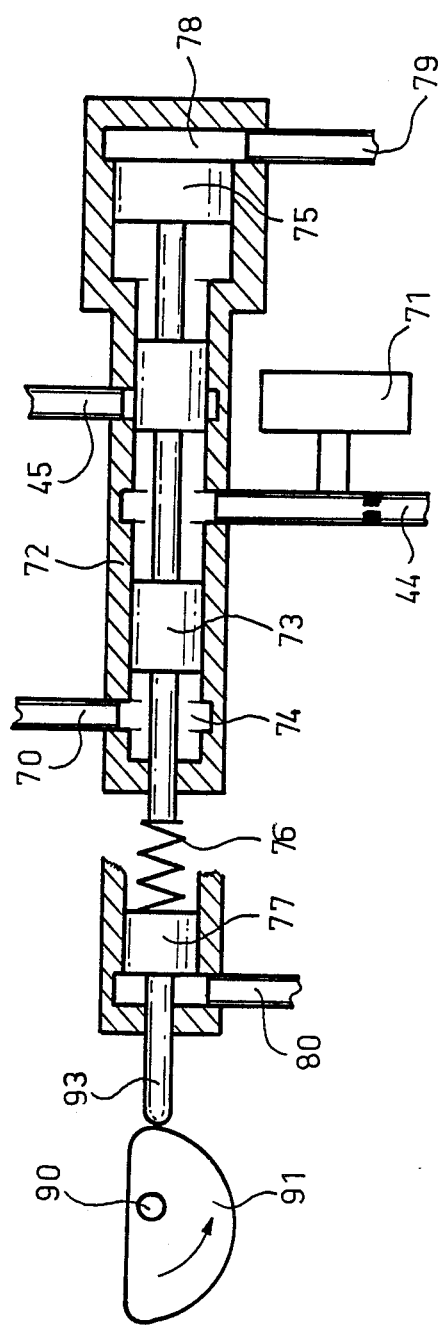
FIG. 2 shows a detailed schematic view of part of the present invention.

At its other end, sleeve 41 is loaded by the compression of a spring 47 which is tensioned through rod 17 and the lever 51 rotating about its fulcrum 50, depending on the prevailing transmission ratio. It will be clear that in this manner the tensioning force in the drive belt 14 is controlled through the fluid pressure in the cylindrical space 12 as a function of input speed, transmission ratio and engine vacuum via a passage 80 (FIG. 2).

The transmission ratio of the infinitely variable transmission is controlled by means of valve 20, which is provided with an axially movable pilot sleeve 21. This pilot sleeve 21 is loaded by the fluid pressure in space 22, which fluid pressure is governed by the primary or input speed of shaft 1.

On the other side, pilot sleeve 21 is loaded by the compression of a spring 27 which is tensioned by means of an actuation member 28. To this end, the actuation member 28 can be displaced in axial direction by rotation about the axis 32 of a cam 31 against which a cam follower 33 of the actuation member 28 rests. Cam 31 may be connected mechanically to the accelerator pedal or throttle lever of the vehicle, so that the position of cam 31 depends on the position of the accelerator pedal or throttle.

The control of the transmission ratio is effected as follows. As long as the transmission is in a given ratio (i.e. not the lowest or the highest transmission ratio at which one of the axially movable sheaves 3 and 9 rests against a stop), the pilot sleeve 21 is in an equilibrium position in which no fluid is discharged from or supplied to cylinder space 4. In this equilibrium position of pilot sleeve 21, which is represented in the drawing, the force of spring 27 equals the force exerted by the fluid in space 22 on the pilot sleeve 21. The force of spring 27, i.e. the position of rotation of cam 31, therefore corresponds to a given input speed, i.e. a given fluid pressure in space 22.

When the output speed, i.e. the rotation speed of shaft 7, increases at a steady position of cam 31, i.e. at a constant external control signal, the transmission will shift to a lower transmission ratio (i.e. a higher gear), because a proportional rise of the input speed of shaft 1 results in an increased fluid pressure in space 22. This pressure rise causes the pilot sleeve 21 to move to the left, so that fluid is conducted to the cylinder space 4 through lines 44 and 6. Shifting continues until the equilibrium of the pilot sleeve 21 is restored. During this shifting, however, the fluid pressure in the cylindrical space 12 also changes, because rod 17 shifts in an axial direction, thereby acting on valve 40.

The change of pressure in space 60 can also be passed on, through line 52, to a coupling member 71 which is disposed between the engine 67 and the input shaft 1.

The fluctuations of pressure in line 52 derived from the movement of the engine block make it possible on the one hand for the coupling 71 to engage smoothly, also upon a sudden increase or decrease of the torque delivered by the engine 67, and on the other hand for the operating pressure of the coupling to vary as a function of the engine load (i.e. the displacement of the engine block 67). FIG. 2 illustrates in some detail how this arrangement can be brought about.

Between line 70 (which is identical with line 52 in FIG. 1) and coupling member 71, a valve 72 is disposed with a sleeve 73. The position of this sleeve is determined by, among other things, the variable pressure in space 74 which depends via the supply line 70 on the movement of the engine block 67. Upon displacement of the sleeve 73, the connection between the pump line 44 and the recycle line 45 is opened to a greater or lesser extent. As a result, the operating pressure originally present in the coupling will vary depending on the movement of the engine block and hence induce the aforementioned smooth operation of the coupling.

In the embodiment represented, sleeve 73 is also fixedly connected to a piston 75 and, through a spring 76, to an actuation member 77. The piston 75 is accommodated in a space 78 in which the pressure, through line 79, depends on the speed of the engine (i.e. the fluid pressure, which is governed by the engine speed; this speed is sensed with means similar to those employed for the primary speed). The actuation member 77 can be displaced in axial direction by the rotation about a fulcrum 90 of a cam 91 against which the cam follower 93 of the actuation member 77 rests. The position of cam 91 depends on the position of the accelerator pedal. By the use of the actuation member according to FIG. 2, therefore, the operation of the coupling is made dependent on a variety of parameters. With correct adjustment of these parameters to one another, the connection between the engine and the driven mechanism will be effected smoothly and without any bumps under the most diverse conditions.

FIG. 1 includes a diagrammatic representation (in dashed lines) of a member 81 intended for damping the movements of the engine 67. This member consists of a cylinder in which a slide 82 can move, depending on the pressure which is brought into play through the lines 83 and 84, respectively. The slide 82 is connected to the element 66 through the rods 85 and 86.

I claim:

1. An infinitely variable transmission for a device with an internal combustion engine, in particular an automobile, provided with an endless transmission member which has been looped over a driving pulley and a driven pulley, each pulley having a groove situated between conical pulley halves, at least one conical half of each pulley being axially movable through an associated hydraulic cylinder, also provided with a fluid pump having a pressure side directly connected with the space in the cylinder of the driven pulley and also connected with a first control valve, containing a first movable piston, the position of which regulates said pressure in dependence on the rotational speed of the driving pulley and the relative position of the sheaves of said pulley determining the transmission ratio, a second control valve containing a second movable piston, the position of said second piston regulating the amount of fluid supplied to and discharged from the cylinder of the driving pulley, the position of the second piston being dependent on the speed of the driving pulley and on the position of an actuation member, characterized in that:

said position of the first piston, which regulates the pressure in the cylinder of the driven pulley, is additionally made dependent on the movements of the engine block by means of at least one additional control valve, provided with a third movable piston and interconnected in a fluid duct which extends between the pressure side of the fluid pump and the first control valve, the position of the third piston being controlled by a fixed connection of the latter to the engine block or to a constructional element fixed to the engine block; and a further additional control valve, having a movable fourth piston, located in the fluid duct which interconnects said additional control valve to the pressure side of the fluid pump, the position of said third piston being controlled by the pressure variations produced by said further additional control valve.

2. A device provided with an internal combustion engine, having at least one hydraulically operated damping member that is attached to the engine block, characterized in that:

said damping member is a valve provided with a slide connected to the engine block and the position of the slide is controlled by an increase or decrease of the fluid pressure in the valve, which pressure is derived from the movements of the engine block by means of at least one additional valve, having a movable piston, in a fluid duct, the position of this piston being controlled by a fixed connection of the piston to the engine block or to a constructional element fixed to the engine block.

* * * * *